April 28, 1959
E. E. STITT
2,883,788
CRICKET DISPENSER
Filed Jan. 31, 1957
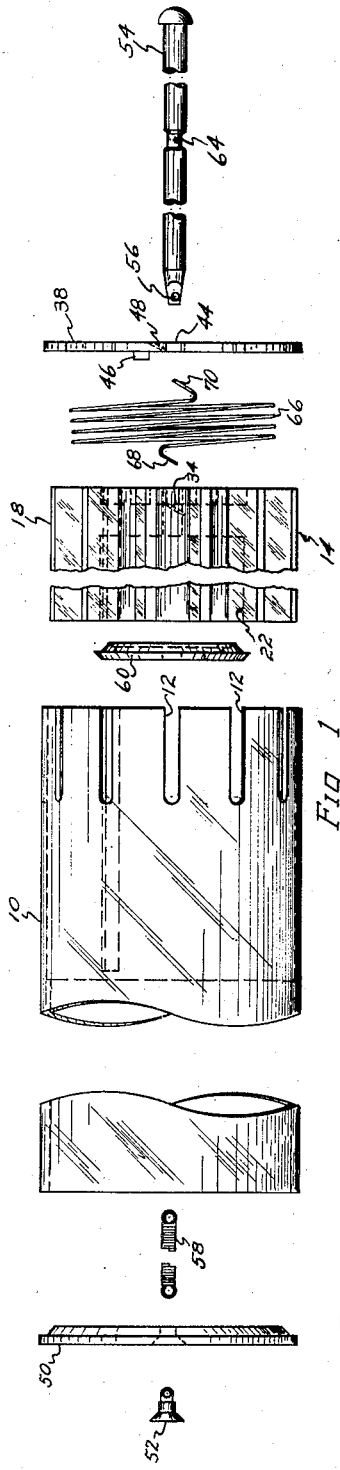
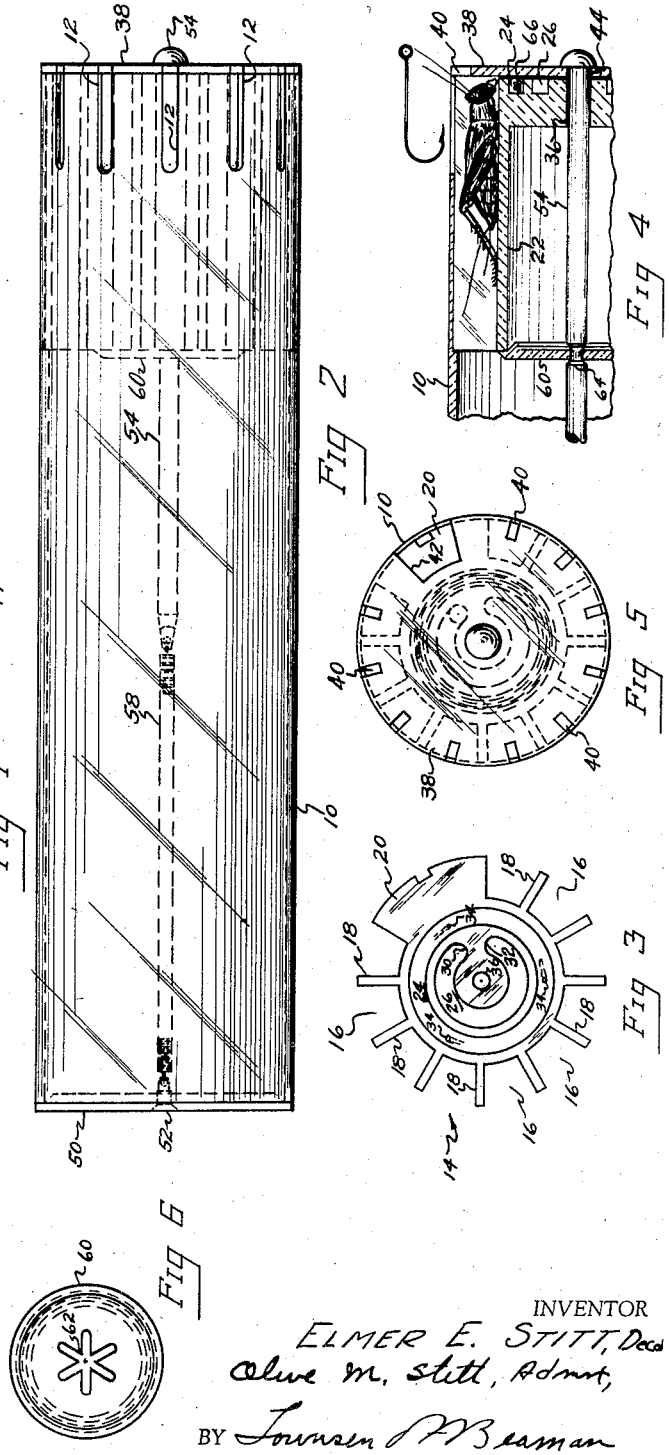
INVENTOR
ELMER E. STITT, Decd
Olive M. Stitt, Admrx,
BY Townsen & Beaman
ATTORNEY

United States Patent Office 2,883,788
Patented Apr. 28, 1959

2,883,788

CRICKET DISPENSER

Elmer E. Stitt, deceased, late of Parma, Mich., by Olive M. Stitt, administratrix, Parma, Mich.

Application January 31, 1957, Serial No. 637,437

5 Claims. (Cl. 43—55)

The invention relates to line bait containers and is particularly directed to a cricket or grasshopper dispenser.

The well known affinity of some species of fish for crickets and grasshoppers has made the cricket a popular bait. However, the lively behavior of a cricket or grasshopper, when placed in a conventional bait box or other container, makes the capture and threading of the cricket on the hook difficult. The live cricket must be stored in a closed container to prevent escape and upon opening the container it is not unusual for some of the bait to climb from the box before one of the crickets can be captured.

It is, thus, an object of the invention to produce a live cricket dispenser which permits removal of a single cricket at a time, preventing loss of the bait.

A further object of the invention is to design a cricket dispenser which permits the cricket to be threaded upon the hook while still in the dispenser thus preventing damage to the bait by manual handling.

Yet another object of the invention is to design a cricket dispenser which is small, lightweight, rustproof and may be easily carried on the person of a fisherman.

These and other objects of the invention will become apparent when viewed with reference to the following description and included drawings wherein:

Fig. 1 is an exploded view of the various components of the invention.

Fig. 2 is an elevational view of the invention when assembled.

Fig. 3 is an end view of the cell member,

Fig. 4 is a cross-section elevational view of the cell end of the assembled cricket dispenser, Fig. 5 is an elevational end view of the invention as seen from the right of Fig. 2, and Fig. 6 is an elevational view of the centering disc.

The cricket dispenser of the invention is preferably of a relatively small size which may be carried in the angler's pocket and is composed of an elongated cylindrical housing 10 which may be made from a transparent material, preferably plastic, and is provided with a series of slots 12 at one end which extend through the wall of housing 10 and are open to the end thereof.

The member restraining the cricket's or grasshopper's movements consist of the cell member 14 which fits within the slotted end of housing 10. As seen in Fig. 3 the cell member 14 is substantially cylindrical and is approximately one-third as long as housing 10, although this ratio is not critical. Member 14 is formed with a series of cells 16 on the periphery which are defined by ribs 18 which extend the length of member 14. As will be noted, a portion 20 of member 14 is left solid, for purposes later described. The inner end of member 14 is bored out at 22 to form a recess eliminating unnecessary weight. The outer end of member 14 is shown in Fig. 3 and is machined such that a shallow annular recess 24 is formed therein. A stop groove 26 is also formed in member 14 spaced from recess 24 by the wall 28. Stop groove 26 does not circumscribe a full 360° but is provided with abutment surfaces 30 and 32. Several small spring retaining holes 34 are drilled in the recess 24 and an axial hole 36 is drilled through the length of member 14. Thus, member 14 may be fixed within the end of housing 10 whereby the ends of ribs 18 will engage the inner wall of the housing and the outer end face of the cell member 14 is flush with the slotted end of housing 10. The ribs 18 are positioned relative to slots 12 such that a slot 12 will be superimposed over each cell 16 thus providing access to the interior of the cells.

A disc-like cap 38 is adapted to enclose the right end of housing 10 as viewed in Fig. 2. Cap 38 is of the same diameter as housing 10 and is formed with a series of radial slots 40 intersecting the periphery and spaced apart a distance equal to the spacing of slots 12. A larger opening 42 is also cut into cap 38 and is of a shape and size corresponding to the cross-sectional area of a cell 16. Cap 38 is provided with an axial hole 44 and a tit 46 which extends in an axial direction. A spring engaging hole 48 is also drilled in the cap 38 for use as seen later.

A cover 50 is used to enclose the left end of housing 10 as shown in Figs. 1 and 2 and is axially drilled and countersunk to provide for eye 52 which extends through cover 50.

Cap 38 and cover 50 are held in place by the headed pin 54 which extends through the holes 44 and 36. The pin 54 is drilled in the end to form a hole 56 whereby a tension spring 58 may be used to connect eye 52 and cover 50 to the pin 54. A centering disc 60 is formed with an expandable axial hole 62 wherein the pin 54 may be pushed through hole 62 until disc 60 aligns with reduced diameter 64 formed in the pin 54. Thus, disc 60 will be positioned on pin 54 such that the recess 22 will be enclosed off from the main part of housing 10 and will also serve to keep pin 52 centered.

A return coil spring 66 is provided with formed ends 68 and 70 and is adapted to be coiled within recess 24 whereby end 68 may engage hole 34 and end 70 will engage hole 48 when the cap 38 is assembled to enclose the end of housing 10. When the cap 38 is flush with the end of housing 10 the tit 46 will project into groove 26 for a purpose later described.

The cricket dispenser is assembled and held together by pin 54 which extends through holes 44, 36 and 62 and is held in position by spring 58 which is looped through hole 56 and a hole in eye 52 thereby also biasing cover 50 on the other end of housing 10.

The dispenser functions as follows:

To load the dispenser the cover 50 is lifted against the tension of spring 58 and a number of crickets or grasshoppers are placed within housing 10. To encourage the crickets to crawl into the cells 16 the cell member 14 is made of a dark material, such as dark green or black plastic, while the cylindrical housing 10 is of a light or transparent material. As crickets and grasshoppers will seek to escape light they will be attracted to the dark cell member 14 and crawl into the cells 16.

When it is desired to bait the hook the fisherman needs only to slip the hook through a slot 12 into the cricket and the hook will be baited. The cell 16 is of such size as to prevent the cricket from moving during the baiting action and thus the cricket is not in danger of being mutilated by excessive pressure as is often the case when a cricket or grasshopper is baited while being held manually.

After the cricket is impaled upon the hook the cap 38 is rotated against the action of spring 66 until opening 42 is lined up with the cell 16 which contains the cricket, permitting the cricket to be removed from the dispenser. Upon removal of the cricket, cap 38 is released and the spring 66 returns the cap 38 to the position shown in Fig. 5. It will be noticed in Fig. 5 that the opening 42 is opposite the solid portion 20 of cell member 14 thereby preventing escape of the bait from the housing 10. Cap 38 is held in this position by the biasing action of spring 66 and the abutment of tit 46 on surface 30 of groove 26. Overwinding of spring 66 is prevented by the engagement of tit 46 and surface 32.

It is, therefore, apparent that the invention discloses a cricket or grasshopper dispenser which may be easily carried by a fisherman, is economical to manufacture and prevents the bait from being damaged during baiting. All the members of the dispenser, except the springs, may be constructed of plastic, which prevents rusting, and insures operation of the rotating parts even though subjected to weather and water.

It will be understood that various modifications to the disclosed embodiment may be apparent to those skilled in the art without departing from the spirit and scope of the invention.

Having thus described the invention, what is claimed as novel and desired to be protected by Letters Patent is:

1. A bait dispenser comprising a housing, a series of bait retaining cell members disposed within a portion of said housing, opening means attached to said housing selectively alignable with each of said cells and access means open to said cells whereby said bait may be impaled upon a fishhook before removal from said housing.

2. A bait dispenser comprising a housing, a ribbed member within said housing coacting with said housing whereby the ribs of said member and said housing define a series of bait retaining cells, a closure enclosing one end of said cells, said closure having an opening selectively alignable with said cells whereby said bait may be removed from said cells and means disposed in said housing permitting access to said cells whereby the bait may be impaled upon a fishhook before removal from said cells.

3. A bait dispenser as in claim 2 wherein said means is provided with slots disposed in said housing.

4. A bait dispenser comprising a translucent cylindrical housing, a dark cell member affixed within said housing adjacent one end thereof, a series of ribs extending radially from said cell member engaging the interior wall of said housing defining a series of bait retaining cells, means enclosing one end of said cells, means permitting removal of the bait from said cells, a cover enclosing the other end of said housing, said housing having slots arranged in communication with said cells whereby said bait within said cells may be impaled upon a fishhook before said bait is removed from said cell.

5. A bait dispenser as in claim 4 wherein said means enclosing one end of said cells comprises a spring biased rotatable cap and said removal permitting means has an opening disposed in said cap intersecting the periphery thereof.

References Cited in the file of this patent

UNITED STATES PATENTS

| | | |
|---|---|---|
| 2,509,816 | Bennek | Apr. 4, 1950 |
| 2,518,590 | Andrist | Aug. 15, 1950 |
| 2,531,551 | Brecht et al. | Nov. 28, 1950 |
| 2,763,956 | Olson | Sept. 25, 1956 |